United States Patent Office 3,428,476
Patented Feb. 18, 1969

3,428,476
METHOD FOR PRODUCING HYDROGEN
DIFFUSION CELLS
Robert C. Langley, Millington, and Herbert Myers,
Newark, N.J., assignors to Engelhard Minerals &
Chemicals Corporation, a corporation of Delaware
No Drawing. Filed June 22, 1965, Ser. No. 466,115
U.S. Cl. 117—62                                  5 Claims
Int. Cl. C23c 3/00; B44d 1/44

ABSTRACT OF THE DISCLOSURE

A method for forming a non-porous hydrogen-permeable palladium alloy film on a porous ceramic support wherein a film of palladium dispersed in a vitreous glaze is first deposited on the support, and a thin film of an alloying metal is deposited on the palladium film and heated to effect interdiffusion of the alloying metal with the palladium.

---

This invention relates to apparatus for the separation of hydrogen from a mixture of gases by diffusion through a non-porous hydrogen-permeable membrane and, in particular, concerns novel means for producing a coated ceramic body for use in such apparatus.

It is known that hydrogen will permeate and diffuse through non-porous films of certain metals, notably palladium and palladium-containing alloys. Heretofore, diffusion apparatus for the separation of hydrogen from a mixture of gases has employed thin films of palladium or alloys thereof in the form of thin-walled tubes, or thin foils. Since the rate of diffusion of hydrogen is a function of the surface area of the non-porous septum employed, its thickness, the pressure differential across it and the temperature, means have been sought to provide a septum of minimum thickness adequately supported upon a pressure-resistant and temperature-stable structural support in order to maximize the rate of flow of hydrogen through the septum.

In copending application Ser. No. 465,861 of Langley et al., filed June 22, 1965, now Patent No. 3,344,586, diffusion apparatus adapted for the separation of hydrogen from a mixture of gases is disclosed, which apparatus employs as the diffusion element a porous ceramic support coated with an integral thin film of palladium or palladium alloy. Such apparatus is designed so as to subject the porous ceramic elements thereof only to compressive isostatic pressure, and the apparatus is designed to eliminate the application of force in tension or shearing forces such as would be encountered by application of pressure to the edges of the ceramic diffusion element. Thus, ceramic supports which are capable of resisting extremely high isostatic compressive forces have been for the first time adapted for practical and commercial utilization in high pressure diffusion apparatus.

In the aforesaid patent application, there are disclosed suitable methods for the application of a thin film of a hydrogen-permeable non-porous metal to the surface of a porous ceramic support. In particular, a novel method for the preparation of a diffusion element suitable for use in such diffusion apparatus, which consists in coating a porous ceramic support with a thin film of a vitreous glaze containing palladium, or palladium alloys permeable to hydrogen, is claimed in copending application Ser. No. 465,999, filed June 22, 1965.

The present invention is particularly concerned with a novel method for applying thin films of palladium-containing alloys to porous ceramic supports, and constitutes an improvement in the methods heretofore known or disclosed for such purpose.

The separation of hydrogen from a mixture of gases containing hydrogen by diffusion through a non-porous palladium membrane is well known, and it is also known that certain alloys of palladium, e.g. palladium containing from 25–40 weight percent silver offer certain advantages in hydrogen diffusion over the pure metal.

In efforts directed toward the production of thin non-porous hydrogen-permeable palladium alloy films on porous ceramic supports, especially palladium-silver alloys, it has been found that at elevated temperatures of the order of 1000° C., palladium-containing alloys react with the porous ceramic support resulting in selective migration of the alloying metal (e.g., silver) from the alloy into the ceramic, leaving an alloy area deficient in this metal. If the alloy was selected to prevent failure of the palladium film due to β-phase formation when cooled in hydrogen, the sections of alloy deficient in the alloying metal lost to the ceramic by migration, do fail. Further, it has been found that at elevated temperatures, e.g., 700° C., palladium-silver alloys react with glazes which may be employed to produce the palladium glaze films disclosed in the aforesaid Ser. No. 465,999, or which may be used to seal surface portions of the porous ceramic supports.

According to the present invention, substantially non-porous hydrogen-permeable palladium-containing alloy films are formed on porous ceramic supports by a two-step method, in which a firmly-adherent palladium film is first deposited on the support by firing at temperatures of about 1000° C., and the palladium film is then coated with an alloying metal and alloyed by heating, in a non-oxidizing atmosphere, preferably in the presence of hydrogen, to effect inter-metallic diffusion of the alloying metal into the palladium film.

In the practice of the present invention, the palladium film can be deposited as a thin, continuous, non-porous film on a porous ceramic support by application of organic solutions of palladium metallo-organic compounds such as have heretofore been employed in the decorating art. In the decorating art, palladium films from organic solutions give relatively thin films of the order of 500–1000 Angstroms per coat. Such thin films are unstable at high temperatures, and it has been found advantageous in preparing a non-porous continuous film to apply multiple coats with each application fired only to 250–350° C. When a total thickness of from about 1.0 micron (10,000 A.) to about 2.0 microns has been applied, the film is thermally stable when fired at about 1000° C.

Using the aforementioned technique, non-porous strongly adherent palladium films can be prepared on a porous ceramic support by employing the following typical formulations:

(A)

|  | Grams |
|---|---|
| Pd Resinate solution (9% Pd) | 3.0 |
| Chloroform | 2.0 |
| Oil of peppermint | 3.0 |

(B)

|  | Grams |
|---|---|
| Dichloro-bis-di-n-butyl sulfide palladium II dissolved in toluene (20% Pd) | 2.0 |
| Rosin dissolved in terpineol (40% rosin) | 0.5 |
| Oil of camphor | 7.5 |

Alternatively, the palladium film can be prepared on a ceramic support by application of a suspension of finely-divided palladium powder in an aqueous or organic solvent medium, preferably applied in a number of successive coats until the desired final thickness of the film is attained.

A preferred method for producing a palladium film on porous ceramic consists in applying a slurry of powdered palladium and a powdered glaze material in water to the surface of the disk and thereafter firing to provide a glaze coating having particles of palladium dispersed throughout the coating, as more fully described in copending application Ser. No. 465,999 of Langley et al., filed June 22, 1965.

In such a film, continuous metal paths are provided from one surface of the glaze coating to the other by employing from about 50 to 95 weight percent palladium metal in the coating. In preparing such palladium-glaze films, conventional high temperature ceramic glazes are employed which have expansion characteristics and softening temperatures so chosen as to minimize problems of differential expansion and loss of film integrity at the operating temperature of the diffusion unit. Satisfactory glazes generally consist of admixtures of alumina and silica containing various other oxide components, including e.g. boria, calcium oxide, strontium oxide and the like, which components are incorporated in the glaze to provide specific thermal expansion and softening properties. Among the commercially available glazes which have been found satisfactory for this purpose are Pemco P–1701, Corning 7056 and Ferro 3292.

The thin palladium or palladium-glaze coatings on porous ceramic supports prepared by the aforementioned techniques are converted to palladium alloy films by coating with an alloying metal in finely divided form or in the form of a soluble organo-metallic compound in an organic solvent, and firing at a temperature sufficient to cause intermetallic diffusion of the alloying metal into the palladium substrate. Multiple coats of the alloying material may be employed, each coat formed from solution being thermally decomposed to metal (below the intermetallic diffusion temperature) prior to application of the next. Sufficient alloying metal is deposited to provide an alloy having desirable hydrogen permeability. For example, in the case of silver, it is desirable to provide sufficient silver to effect conversion of the palladium to an alloy containing from about 10–40% by weight silver. Such alloys exhibit a practical level of $H_2$ diffusion and stability to $\beta$-phase transformations as compared to pure palladium.

Typical silver and gold solutions which are known from the decorating art and which are suitable for application by brushing were prepared as follows, although it is to be understood that similar known formulations are equally applicable in the present invention:

Preparation of a silver solution containing
7.15% Ag by weight

A silver solution having a viscosity suitable for application by brushing was made as follows:

|   | Grams |
|---|---|
| Silver naphthenate (32% Ag) | 3.35 |
| Toluene | 11.13 |
|   | 14.48 |

The silver naphthenate was dissolved to a stiff gel by stirring mechanically for 2 hours at room temperature. 0.52 grams of t-octyl amine were then added and, with stirring continued for a few more minutes, the solution became fluid. The amber brushing solution then contained 7.15% Ag by weight or approximately .01 mole of silver naphthenate and .004 mole of amine.

Preparation of a gold solution containing
17% Au by weight

A solution containing 17% Au by weight was made by dissolving gold sulforesinate in a mixture of oil of rosemary, nitrobenzene, chloroform and ethyl acetate, with these solvents present in proportion of 3:3:2:2 by weight. This solution had good brushing properties.

Preparation of a gold solution containing
12% Au by weight

A solution containing 12% Au by weight was made by diluting the above solution with oil of peppermint. This diluted solution also had good brushing properties.

Alternatively, the gold or silver may be applied as finely-divided powders, e.g. 325 mesh, used dry or in aqueous or organic suspension. Preferably, the finely divided metal powder is applied as an aqueous slurry.

The ceramic supports to which the palladium-glaze films of the present invention are applied shall be highly resistant to physical and thermal shock, sufficiently porous for gas to flow through, and should preferably have a smooth surface finish in order to be able to coat a thin unbroken layer of the palladium-glaze film.

As more fully disclosed in copending application Ser. No. 465,861 referred to above, a satisfactory porous ceramic support can be prepared from a mixture comprising generally from 50–90% by weight alkali aluminum silicates, 10–50% clay and from 0–10% silica. It has been found that the free silica content should not exceed 10% by weight of the ceramic mix to provide a fired ceramic of low thermal expansion and good resistance to shock.

It has been further found that the ceramic body should be free of reducible components such as lead, iron or tin, for example, since the gases being separated provide a reducing atmosphere within the diffusion apparatus and reducible components could react adversely with the thin Pd-containing film.

In practice, the porosity of a ceramic mix such as that described above may be provided by adding carbon to the mix and firing the mix at a temperature and for a time sufficient to burn out the carbon powder while keeping the temperature as low as possible so as to reduce as much as possible the densification of the ceramic body formed by the melting of alkali aluminum silicates in the mix.

The particular components and their percentage in the mix may be varied to some extent and still produce thermal and structural properties which will be suitable for providing a ceramic support for a non-porous gas-permeable membrane coated thereon in accordance with the invention. In practice, nepheline syenite has proved a particularly suitable alkali aluminum silicate, and the clay component is preferably made up of a mixture of kaolin, which is included for its purity, and ball clay, which provides plasticity and strong bonding power. In preparing the ceramic parts of the ceramic body, the silicate, clay and silica are thoroughly mixed dry and then glycerin or water mixed with a binder, such as polyvinyl alcohol, methyl cellulose, acrylic resin, or polyethylene glycol, for example, is mixed in the dry materials to form a cohesive plastic mass suitable for molding into the desired shape. An emulsion of microcrystalline wax has also proved to be a good binder and lubricant. As discussed above, carbon powder, such as fine carbon black, is incorporated in the mix to provide porosity. The carbon black is suitably provided in the amount of 20–40% by weight, of the total weight of the other dry ingredients of the mix.

The green-molded parts are fired in a periodic furnace which is progressively heated from room temperature to about 1100° C. over a 24-hour period. The furnace is then allowed to cool slowly to about room temperature again before the fired parts are removed. The firing may also be done in a continuous furnace, in which case the time required would be reduced to about one-third the time required in the periodic oven.

A specific example of the ingredients and the process for producing a suitable porous ceramic support is as follows:

Preparation of support

A dry mixture of 25% Georgia kaolin, 15% Tennessee ball clay, 55% nepheline syenite, and 5% silica is made by tumbling these ingredients in a bottle for several hours after which 200 mesh carbon black is added and thoroughly mixed in by further tumbling for about 8 hours. The porosity of the finished piece is largely determined by the amount of carbon black used and for a porosity of 40–50%, which is preferred in accordance with the invention; the proportion of carbon black to the other ingredients is about 20 to 40%.

When the dry mixing is complete the mixture is dampened with a fluid which serves as a binder and lubricant. The moisture content is preferably about 25–30% which supplies the moisture necessary to be able to press the mass into the desired disk shape satisfactorily. The fluid is suitably 3–10% glycerine as the binder and the remainder water as the lubricant.

The fluid is mixed in to dampen the mixture thoroughly. Then the mixture is pressed into the desired disk shape (e.g. 1–3 inches by ⅛-inch thick) in a stainless steel mold at 5000 p.s.i. These disks are then air dried overnight and fired in a periodic furnace which is raised to a temperature of about 1100° C. progressively over a period of about 24 hours.

In general, it is preferred to have the porous ceramic supports as thin as possible, consistent with strength, to reduce the resistance of gas to flow. Preferably, the porous ceramic supports are ⅛–¼ inch in thickness, and channels may be provided within the support to reduce the effective thickness to about ¹⁄₁₆–⅛ inch.

The palladium-containing film of the invention should be sufficiently thin to provide high rates of hydrogen diffusion, but not so thin as to result in porosity which would decrease the purity of the separated diffused hydrogen stream. In general, a film thickness of 0.05 mil to 1.0 mil, preferably 0.1 to 0.4 mil has been found effective. In practice, the film may be produced from a single coat of metal powder or metal powder and glaze, but preferably is formed by coating with multiple layers thereof with intermittent firing until a film of desired thickness is built up.

The following examples are given to set forth in detail certain preferred embodiments of the invention, it being understood that the invention is not to be limited to the specific details set forth herein.

Example I

Pemco glaze P–1701 in the form of 325 mesh powder was mixed with 325 mesh powdered palladium in a weight ratio of 91% palladium–9% glaze. Water was added to form a slurry suitable for applying by brush and a thin coat of the slurry was painted on a porous ceramic support of the type described hereinabove. The coated disk was fired at 1000° C. with a one-hour soak.

Four additional coats were similarly applied by brushing on a thin coat of the slurry and firing to obtain a non-porous coating. The palladium-glaze film thus prepared was tested for $H_2$ diffusion at 600° C. and 15 p.s.i.g. $H_2$ upstream and atmospheric pressure downstream, and found to have a permeability of about 200 cc. $H_2$/minute/square inch.

A solution of silver naphthenate complexed with t-octyl amine (as described hereinabove) was applied over the thus formed palladium-glaze film. Multiple coatings were applied, each coating being thermally decomposed to silver at 250° C. before application of the next, until sufficient silver was deposited to give a Pd/Ag net ratio of 3:1.

The coated diffusion element was tested for hydrogen diffusion at 600° C. and 15 p.s.i.g., and found initially to be impervious to hydrogen since all the silver was at the surface. The diffusion element was held in hydrogen at 600° C. for about 6 hours, during which time diffusion of hydrogen gradually increased to about 200 cc./minute/square inch, indicating that alloy formation was proceeding to completion at 600° C.

Example II

A palladium-glaze film on porous ceramic support was prepared as described in Example I. The coated diffusion element was then painted with the previously described organic solution containing 17 weight percent gold. Multiple coats of the gold solution were applied, each coat being fired at 300° C., until a gold weight equal to 25% of the initial palladium weight has been applied. The entire surface was gold in appearance, and at 600° C. and 15 p.s.i.g. pressure differential exhibited negligible hydrogen diffusion.

The coated diffusion element was then maintained at 600° C. in hydrogen for 16 hours. Diffusion of hydrogen rapidly increased to 200 cc./minute/square inch and the film finally lost its gold appearance and resembled palladium in color.

Exampe III

Multiple coats of a palladium-glaze film were formed on a porous ceramic disk by applying an aqueous slurry of powdered palladium and glaze as in Example I. Each coat was fired at 925–1000° C. and after application of 16 coats, the palladium-glaze film was 0.0002 inch thick. Hydrogen diffusion at 500° C. and 15 p.s.i.g. hydrogen pressure was found to be 65 cc./minute/square inch.

The diffusion element was then coated with the previously described organic solution of gold sulforesinate containing 12% gold by weight. Multiple coats were applied with intermediate firing at 300° C. After sufficient coats had been applied to provide a film having a palladium: gold ratio of 90:10 by weight, the diffusion element was heat treated in hydrogen at 630° C. for 16 hours.

The resultant diffusion element was tested for hydrogen permeability at 500° C. and 15 p.s.i.g. pressure (differential) and exhibited a diffusion rate of 445 cc./minute/square inch. This rate is about seven-fold the rate of the starting palladium-glaze film.

Example IV

A porous ceramic is coated with palladium by brushing on a solution of palladium resinate dissolved in oil of peppermint and chloroform and containing 4.5% Pd by weight. Twelve coats are applied with each fired at about 350° C. in air to thermally decompose the resinate to metal. After 12 coats, a palladium film about 1.2 microns thick is on the substrate. This film is then fired to 1000° C. in air with a one hour soak to compact the film and bond it to the substrate.

The silver naphthenate solution described above is then applied by brushing over the palladium in several coats with each fired at about 200° C. in air. When a silver weight equal to ⅓ the palladium weight has been added, the coated ceramic is heated for 4 hours at 600° C. in hydrogen to form a 75:25 Pd:Ag alloy in situ.

Example V

A palladium coated porous ceramic disk was prepared with multiple coats of 325 mesh palladium powder suspended in water. Each coat was fired in air at 1000° C. with a 30 minute soak at peak temperature.

To the palladium coated surface of the porous ceramic substrate, 325 mesh gold powder in a water slurry was applied by brushing. Sufficient gold was added to provide a weight ratio of 4.5 palladium to 1 gold. The disk was fired to 1000° C. in a nitrogen rich air mixture for ½ hour. The resultant film resembled palladium in color indicating that an alloy had been formed. The film diffused hydrogen, further indication that a hydrogen permeable alloy had been formed.

What is claimed is:

1. A method for forming a non-porous hydrogen-permeable palladium alloy film on a porous ceramic support which comprises the steps of coating the support with a thin adherent non-porous film of palladium dispersed in a vitreous glaze, said film containing at least about 50% by weight palladium, depositing a thin film of an alloying metal selected from the group consisting of solver and gold on said palladium film, and heating the supported coating in a non-oxidizing atmosphere at an elevated temperature to effect interdiffusion of the alloying metal with the palladium.

2. The method of claim 1 wherein the alloying metal is silver.

3. The method of claim 1 wherein the alloying metal is gold.

4. The method of claim 1 wherein the alloying metal is deposited in the form of an organo-metallic compound dissolved in an organic solvent.

5. The method of claim 1 wherein the alloying metal is deposited in an amount to produce an alloy consisting of 10–40% alloying metal, the remainder being palladium.

References Cited

UNITED STATES PATENTS

| | | | |
|---|---|---|---|
| 2,002,262 | 5/1935 | Domm | 117—71 |
| 2,440,691 | 5/1948 | Jira | 117—227 |
| 2,786,925 | 3/1957 | Kahan | 117—71 |
| 2,824,620 | 2/1958 | De Rosset | 55—16 |
| 2,924,540 | 2/1960 | D'Andrea et al. | 117—227 |
| 2,958,391 | 11/1960 | De Rosset | 55—16 |
| 2,973,283 | 2/1961 | Hill | 117—71 |
| 3,154,503 | 10/1964 | Janakirama-Rao et al. | 252—514 |
| 3,216,834 | 11/1965 | Fitch | 117—227 X |
| 3,232,886 | 2/1966 | Hoffman | 252—514 |

ALFRED L. LEAVITT, *Primary Examiner.*

C. K. WEIFFENBACH, *Assistant Examiner.*

U.S. Cl. X.R.

117—62, 123, 125, 160; 55—16, 158